Feb. 16, 1954  B. F. SIMMONS  2,668,964
HEADREST MECHANISM FOR CREEPERS
Filed Jan. 22, 1952
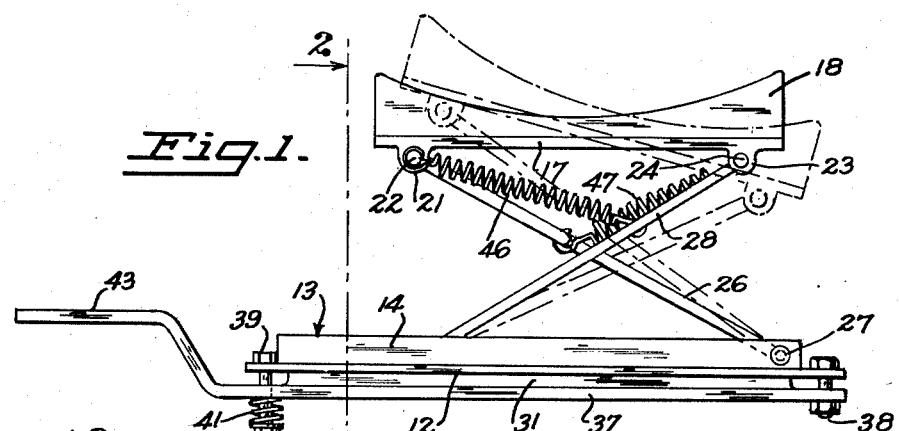
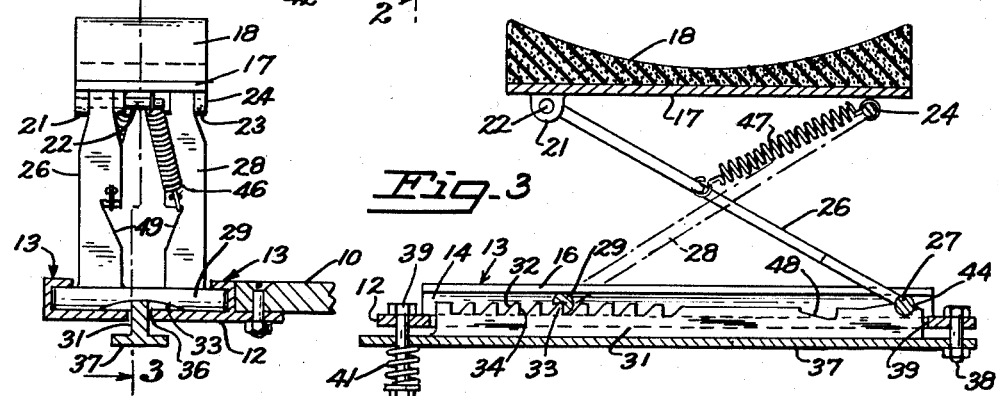
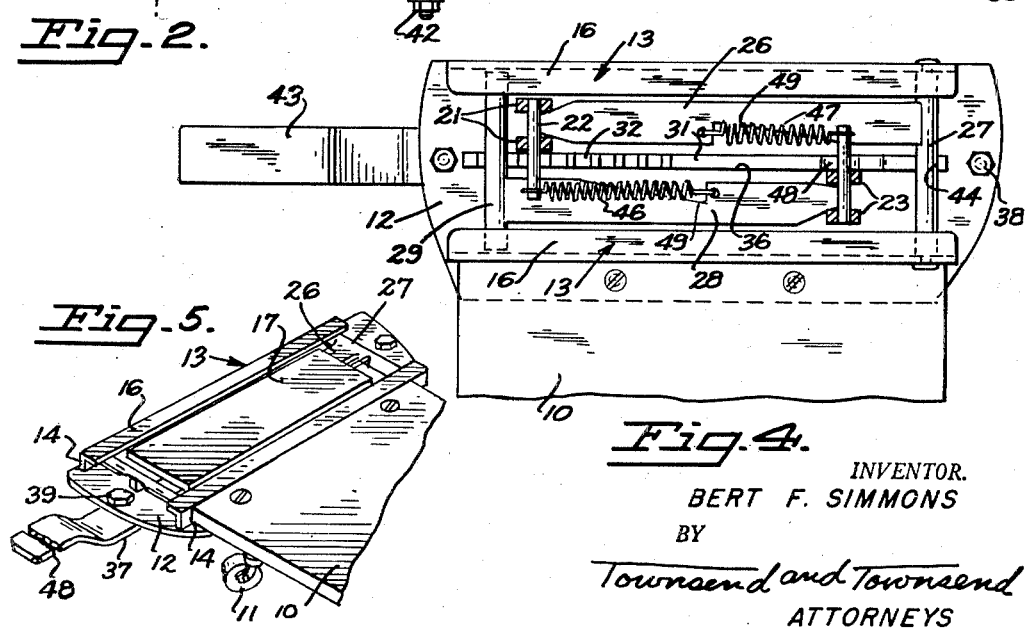
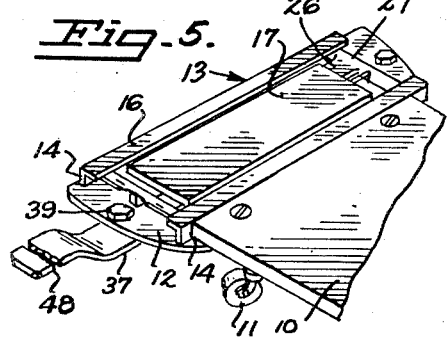
INVENTOR.
BERT F. SIMMONS
BY
Townsend and Townsend
ATTORNEYS Patented Feb. 16, 1954

2,668,964

UNITED STATES PATENT OFFICE 2,668,964

HEADREST MECHANISM FOR CREEPERS

Bert F. Simmons, Medford, Oreg.

Application January 22, 1952, Serial No. 267,617

3 Claims. (Cl. 5—327)

This invention relates to new and useful improvements in head rests for creepers of the type used by mechanics while working under vehicles. More particularly, the invention relates to a head rest associated with a base plate which may be attached to a creeper and which is characterized by the fact that the head rest is adjustable in elevation with respect to the base, said adjustment being quickly and conveniently manually controllable, and further characterized by the fact that the head rest is resiliently mounted with the result that the angular position of the head rest with respect to the base conforms to movement of the head of the mechanic.

Accordingly, it is one of the principal objects of the invention to provide a head rest adjustable in elevation with respect to its base and further to provide convenient and readily adjustable means for controlling said adjustment of elevation.

Another object and advantage of the invention is the fact that the head rest is supported above the base by a pair of crossed levers, pivotal movement of said levers being counterbalanced by springs so that the position of the head rest automatically conforms to movement of the head of the mechanic employing the device.

Other objects of the present invention will become apparent upon reading the following specification and referring to the accompanying drawings in which similar characters of reference represent corresponding parts in each of the several views.

In the drawings:

Fig. 1 is an elevation of the head rest in raised position showing in dot-and-dash lines the head rest tilted to one side and in solid lines the head rest in normal horizontal position.

Fig. 2 is a vertical section taken substantially along the line 2—2 of Fig. 1.

Fig. 3 is a section taken substantially along the line 3—3 of Fig. 2.

Fig. 4 is a top plan of the head rest and a portion of the creeper in collapsed position with the head plate and cushion removed.

Fig. 5 is a perspective of the head rest and a portion of the creeper in collapsed position with the cushion removed from the head plate.

As illustrated in the accompanying drawings, there is provided a creeper 10 mounted on casters 11, said creeper 10 being of the conventional type used by mechanics to position themselves under vehicles while repairs are being made. Attached adjacent one end of said creeper is a base plate 12 of the shape illustrated in the drawings extending transversely of the creeper. Rigidly fixed to said base plate is a pair of opposed guideways 13, said guideways being preferably formed of angle bars having one flange 14 perpendicular to said base and the other flange 16 parallel and spaced from said base plate.

There is further provided a rectangular head plate 17 having a width slightly less than the distance between the edges of said horizontal flanges 16. Said head plate bears on its top surface a pad or cushion 18 upon which the head or neck of the mechanic rests, said cushion preferably being concave so as better to accommodate the head or neck of the mechanic. On the underside of the head plate, adjacent one corner thereof, is a pair of spaced-apart, depending lugs 21, said lugs being apertured for the reception of a pin 22, the axis of which is transverse to said guideways 13. In the corner of said head plate diagonally opposite, there is provided a second pair of lugs 23 apertured for the reception of a second pin 24. One end of first lever 26 is fixed to said first pin 22 and the other end of said first lever 26 is pivotally connected to said base plate 12 by means of pin 27 which extends across between said guideways. Pin 27 may rotate with respect to plate 12 but may not move longitudinally or transversely with respect thereto. Thus, pin 27 may extend through vertical flanges 14 of guideways 13 and be rotatably held therewithin. There is further provided a second lever 28, one end of which is rigidly connected to pin 24 and the lower end of which is fixed to transverse pin 29 which extends between said guideways. Pin 29 is slidable longitudinally with respect to the guideways, its ends being perpendicular to its axis and its length being only slightly less than the distance between flanges 14. It will be noted that levers 26 and 28 cross but have no connection and thus, by reason of the fact that pin 29 slides in guideways 13, whereas pin 27 is fixed with respect to base 12, the elevation of head plate 17 with respect to base 12 may be adjusted by sliding movement of pin 29 within guideways 13.

In order to control the elevation of head plate 17 with respect to base 12, there is provided near one end of said base a ratchet bar 31. Said ratchet is formed with a buttress thread, the angular flanks 32 of which are inclined upwardly toward the opposite end. In order to engage said ratchet, pin 29 is milled as indicated by reference numeral 33 so as to have a substantially vertical surface which presses against the vertical flank 34 of the buttress thread and prevents movement of pin 29 to the left as viewed in Fig. 1. Thus, the elevation of head plate 17 may be increased by manually raising plate 17 because pin 29 moves readily to the right as viewed in Fig. 1, whereas lowering of said plate 17 is restrained by reason of engagement of pin 29 with the vertical flanks 34 of said ratchet bar 31. It will be observed that ratchet 31 is formed on the upper edge of a vertical flat bar which projects up as a chine through slot 36 in base 12, the lower edge of said ratchet bar being welded to handle member 37 which extends along the bottom of said base. One end of said handle member is attached to the right-hand end of the base as viewed in Fig. 1 by bolt 38. Bolt 39 passes through a hole in base 12 and in handle member 37 adjacent the left-hand end of the base, there being further provided a spring 41 on said bolt below said handle and a nut 42 holding said spring on said bolt. It will be seen that the spring 41 biases said ratchet bar 31 upwardly through slot 36 to engage pin 29, but when the upwardly offset grip portion 43 of handle 37 is depressed, ratchet bar 31 is retracted from engagement with pin 29, thereby permitting movement of the pin 29 to the left as viewed in Fig. 1 and lowering head rest 17 at the manual control of the operator. The right-hand end of ratchet bar 31 is notched as indicated by numeral 44 to accommodate pin 27 when ratchet bar 31 occupies its normally upwardly spring biased position.

Fixed to first pin 22 is helical coil spring 46, one loop of which passes through a hole in one end of said pin 22. The opposite end of spring 46 passes through a hole in about the mid-point of second lever 28. Similarly, second coil spring 47 is attached at one end by similar means to second pin 24 and at its opposite end to the midpoint of the first lever 26. It will be observed that head plate 17 may be inclined in either direction with respect to the horizontal by reason of pivotal movement of pins 22, 24, 27, and 29, coil springs 46 and 47 counter-balancing the inclination of head plate 17. Thus, the position of said head rest conforms to movement of the head of the mechanic employing the creeper, the resilient characteristics of springs 46 and 47 restricting said conformation.

In order to permit the head rest to collapse with head plate 17 substantially flush with horizontal flanges 16, certain of the parts are cut away to provide space in which the other parts may nest. Thus, notch 48 is cut in the upper surface of ratchet bar 31 to clear pin 22 when in collapsed position, and levers 26 and 28 are notched as indicated by reference numeral 49 to clear springs 46 and 47.

In operation, the mechanic positions creeper 10 under the vehicle with the head rest in collapsed position. When in position, he may manually lift up and raise head plate 17 to the proper elevation, pin 29 sliding to the right as viewed in Fig. 1 and engaging one notch of ratchet 31. By reason of the resiliency of spring 41, ratchet 31 is depressed in order to allow pin 29 to drop into the proper notch. As the mechanic has occasion to move his head about, the inclination of head plate 17 with respect to the horizontal conforms to his movements, coil springs 46 and 47 restraining said movement. When it is desired to collapse the head rest, the mechanic manually depresses grip 43 which in turn depresses ratchet bar 31 and permits pin 29 to move to the left.

As above explained, cushion pillow 18 is shaped and proportioned to present an arcuate cradle which will comfortably nest a mechanic's head. The cradle shape of the pillow will also function to prevent the mechanic's head from sliding off either edge of the pillow as he tilts or inclines the head rest from side to side.

Although I have described my invention in some detail by way of illustration and example for purposes of clarity of understanding, it is understood that certain changes and modifications may be practiced within the spirit of the invention and scope of the appended claims.

I claim:

1. A head rest comprising a base; a head plate; first means interconnecting said base and head plate; said first means comprising first and second unconnected crossed levers pivotally attached to opposite ends of said head plate; said first lever being pivotally attached to said base; said second lever being movable along said base; second means adjustably positioning said second lever in a plurality of positions comprising a ratchet on said base and a pin on said second lever engageable with said ratchet in a plurality of positions; a spring biasing said pin and ratchet into mutual engagement; a handle manually operable to retract said pin and ratchet from mutual engagement; and resilient means extending from said head plate to each of said levers and a concave cushion on the upper side of said head plate.

2. A head rest according to claim 1 in which said handle extends under said base and said ratchet extends upward as a chine through a slot in said base.

3. A head rest according to claim 1 in which is further provided guideways on said base engaging said pin for slideable movement with respect to said base.

BERT F. SIMMONS.

References Cited in the file of this patent

UNITED STATES PATENTS

| Number | Name | Date |
|---|---|---|
| 317,468 | Morstatt | May 5, 1885 |
| 1,327,103 | Knowles | Jan. 6, 1920 |
| 1,457,117 | London et al. | May 29, 1923 |
| 1,706,579 | Martin | Mar. 26, 1929 |
| 2,567,341 | Martin | Sept. 11, 1951 |

FOREIGN PATENTS

| Number | Country | Date |
|---|---|---|
| 587,920 | Great Britain | May 8, 1947 |